May 25, 1965 D. M. PATTON 3,185,369
BACKUP FOR WELD JOINTS
Filed Oct. 14, 1959
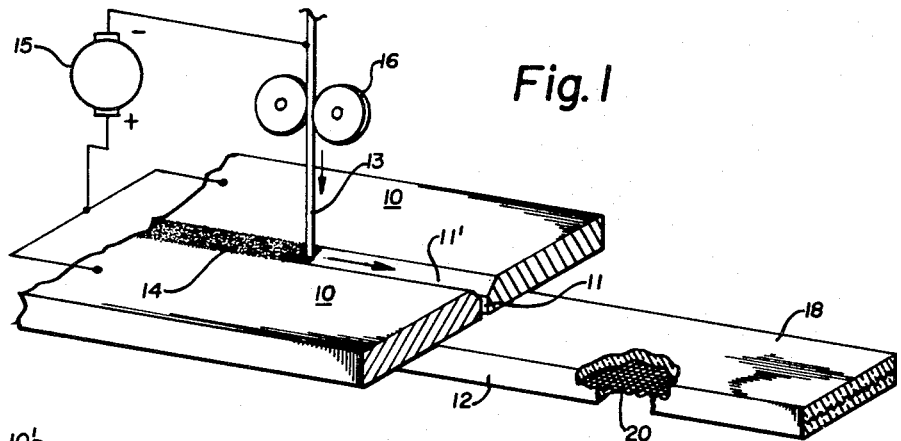
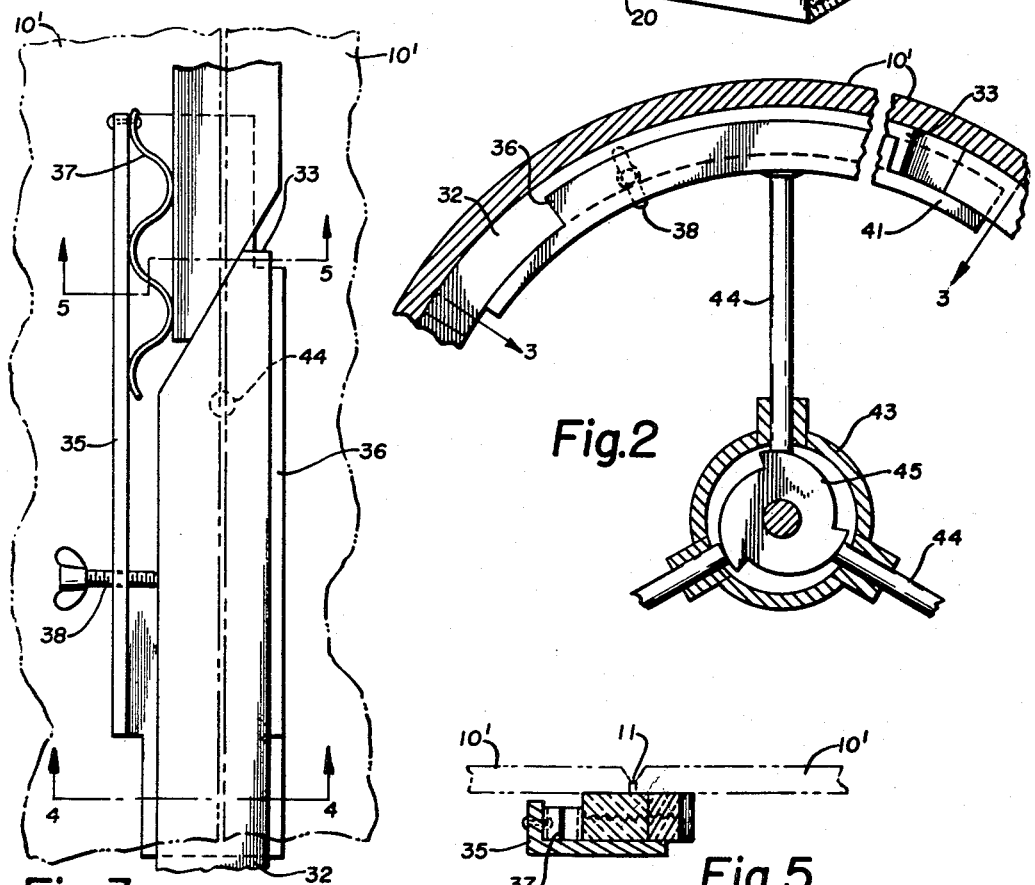
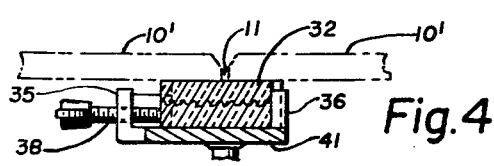
INVENTOR.
DONALD M. PATTON United States Patent Office 3,185,369
Patented May 25, 1965

3,185,369
BACKUP FOR WELD JOINTS
Donald M. Patton, Willowick, Ohio, assignor to The Lincoln Electric Company, Cleveland, Ohio, a corporation of Ohio
Filed Oct. 14, 1959, Ser. No. 846,364
9 Claims. (Cl. 228—50)

This invention pertains to the art of welding, and more particularly to improved means for backing up a weld joint or seam during welding.

The invention is particularly applicable to the arc welding of the various steels, e.g. low or high carbon, and low or high alloy and will be described with particular reference thereto although it will be appreciated that the principle upon which the invention is based makes it equally applicable to the welding of other metals such as aluminum, titanium, copper and the like, either using gas, an arc or other sources of heat.

The invention is also particularly applicable to the field of pipe welding and will be described with particular reference thereto, although it will be appreciated that it is equally applicable to the welding of flat plates and curved plates whether the seam is horizontal, vertical or at an angle.

In the art of arc welding, it is conventional to position the edges of the members to be welded either in abutting or close spaced relationship and then move a welding electrode along the edges while maintaining an arc between the end of the electrode and the edges to both fuse the edges and deposit molten electrode metal to give an interfused weld bead which integrally joins the two members.

Where the members are relatively thin, or where the position of the members is such that it is difficult to weld from both sides of the members, it has been conventional in the past to use what has been termed a "backup strip" which fits against the sides of both members opposite from the welding electrode and extends across or over the space between the edges. The rate of movement of the electrode along the edges and its electrical energization is then so adjusted that the edges are fused across their entire width and molten metal comes in to contact with the backup strip.

Such a backup strip performs the dual function of excluding air from the side of the members remote from the welding electrode (which normally has its own means for excluding the air) as well as assisting in the ultimate shaping of the weld bead on the side of the members remote from the electrode. Normally this weld bead should be either flat and flush with the sides of the members, or and more desirably, should have a slight convexity. Also as a prime requirement, the weld bead must have no or a minimum of porosity.

Materials and arrangements for such backup strips were extensively investigated during the war by the Battelle Memorial Institute with the results reported in the November 1948 issue of the Welding Journal, pages 555-s to 567-s. Such investigation was searching for a backup material which would eliminate the disadvantages of copper or steel backup strips and generally covered many of the ceramic materials. In general, these ceramic materials were either in powdered or granular form, in some instances being bonded with known binding materials such as sodium silicate and the like. Based on the results of the present invention, the results of this investigation did not produce a satisfactory backup strip for reasons which will appear hereinafter.

Also glass, either in the form of glass fibers as taught by the patent to Smith, 2,362,505, issued Nov. 14, 1944, or as a solid member as taught by the patent to Chyle et al., 2,820,427 issued Jan. 21, 1958, have been used in backup strips. Glass, however, contains excessive amounts of silicon dioxide, resulting in excessive amounts of silicon migration to the weld metal and sodium oxide, which has a boiling temperature less than the melting temperature of steel and tends to cause pock marks in the surface of the weld bead or porosity therein.

Research leading to the present invention indicated that the material of the backup strip may evolve only a negligible amount of gas during the welding operation. The gas, if any, that is evolved must condense at a temperature sufficiently above the melting point of the weld metal so that should any of the gas be entrapped it will condense before the metal freezes, allowing the walls of the bubble to collapse, thereby eliminating the possibility of porosity from that source in the weld metal.

The melting temperature for iron and the various steels may vary from 1150° C. for white cast iron to 1535° C. for pure iron and the condensing temperature for the gas (which is the same as the boiling temperature for the same element or compound as the gas) must, to meet the above requirement, be at least 50° C. higher (and preferably more) than the melting temperature of the weld metal, whether it be white cast iron, gray cast iron, low carbon steel, high carbon steel, low alloy steel, high alloy steel, or pure iron.

Such research further indicated that the material of the backup strip must have a melting temperature not greater than the solidifying temperature of the weld metal, and must not contain materials or elements which will migrate into the molten weld metal and exert an undesirable alloying effect thereon.

Thus, in accordance with the invention, the ingredient or ingredients selected for the material of the backup strip must have a boiling or sublimation temperature higher than the weld metal melting temperature plus 50° C. In normal practice, and in all of the preferred embodiments, the boiling or sublimation temperature will be above 1600° C. so that one material will work with all ferrous weld beads.

Further the ingredient or ingredients selected must not react chemically or break down chemically when in contact with the molten weld metal to produce or evolve a gas.

However, even the selecting of materials of such characteristics does not entirely eliminate the evolution of gas because of the tendency for many materials as they stand in storage to either absorb or adsorb moisture from the atmosphere, or because they contain contaminants in the as purchased condition or have contaminants introduced therein during or after processing, which moisture or contaminants produce gas upon being heated. Thus, the materials should also be non-deliquescent, should have as low a ratio of surface area to volume as is possible or practicable, and should be processed in a manner or be in a physical form such that the moisture or contaminants are either eliminated or they evolve their gas before use and remote from the weld bead.

The problem of gas evolution by moisture is, in accordance with the present invention, handled (a) by selecting materials which are non-deliquescent and have a melting temperature substantially above the boiling temperature of water e.g. 200° C. and (b) by completely fusing or melting the material or materials and allowing them to congeal into a large homogeneous mass which preferably has a surface generally conforming to the surface of the side of the members remote from the welding electrode, hereinafter generally referred to as the under or backside of the weld bead.

Such a large homogeneous mass with a surface conforming to the surface of the backside of the members assists materially in excluding air from this backside of the weld bead.

Desirably the mateiral in the molten state should be cast against the under or backside of the members being welded. However, in practice, this is somewhat difficult and in a further more limited aspect of the invention, the molten material of the backup strip is cast into a form having a surface generally conforming to the surface of the backside of the members to be welded. In a further alternative arrangement, the mass may be blocks or cubes having a ratio of surface area to volume of not more than 24 to 1, e.g. cubes having a minimum dimenison of ¼ inch, it being preferred with such blocks that they be so arranged that they form a continuous surface which can be in continuous engagement with the backside of the members being welded, rather than a point contact if they were haphazardly arranged.

The fusing or melting action enables any moisture which might be trapped in or on the various ingredients which go to make up the material of the weld strip to be completely boiled away and driven off. Also the fusing or melting enables any gas evolving actions between the various ingredients or contaminants to take place prior to the welding and remote from the weld bead.

By completely fused or melted, it is intended to distinguish from granular particles which have been heated to a temperature below their actual melting temperature while holding them in pressure engagement, a process generally known as sintering. The particles not being melted tend to trap and prevent the driving off of the moisture from the interior parts of the body. Also, sintering leaves a plurality of cleavage planes between the individual particles which can be, and oftentimes are, highly moisture absorbent.

By the backup strip being a large homogeneous mass, it is intended to distinguish from where the various ingredients making up the material of the weld strip are fused or melted, allowed to congeal, and are then broken, crushed or ground into relatively small granules on the order of $\frac{1}{16}$ of an inch in diameter or less, which granules are then packed by known means against the backside of the members to be welded. Such granules have large ratios of surface area to volume, i.e., approximately 96. In such case the surface area tends to adsorb moisture or vapors from the air.

As the volume of the materials will be approximately the same regardless of the ratio of surface area to volume, and as the amount of moisture adsorbed for a given material is solely a function of surface area, by holding the surface area to volume ratios down in accordance with the invention, the amounts of moisture adsorbed for a given volume of material can be held below the maximum tolerance for moisture.

Also, particles can more easily become contaminated with other liquids such as oil or the like or gas producing solids (e.g., paper, tobacco) which will evolve gas when heated by contact with the molten weld metal. Also, air is present in the spaces between the granules or can filter through the granules to the heated weld metal.

It is further intended to distinguish from the provision of a powder or a plurality of granules which are bound together by binder materials such as sodium silicate or the like. Sodium silicate contains water of hydration which is extremely difficult to remove unless heated to temperatures which would, in effect, fuse or melt the particles or granules to be bound together.

As to the requirement that the backup strip material does not contain elements which will migrate to the molten weld metal and have an undesirable alloying effect therewith, it is to be noted that in many instances the migration of manganese, chromium, or nickel to the weld metal is not considered detrimental while the migration of silicon in large amounts and sulphur or phosphorous in any amount is considered detrimental.

For steel and its alloys, ingredients meeting the above requirements and coming within the scope of the present invention, subject to the exceptions hereinafter set forth, may be one or more of the ingredients selected from the class consisting of the oxides of calcium, the rare earths, zirconium, aluminum, magnesium, titanium, lithium, nickel, silicon, chromium, vanadium, strontium, manganese, barium and columbium; the fluorides of lithium, calcium, barium, strontium, lanthanum, rare earths, magnesium, sodium, zirconium, chromium, iron, cobalt, nickel, cadmium, and manganese; and the chlorides of copper lanthanum, the rare earths, strontium, calcium and barium. The oxide of sodium is specifically excluded because of its low boiling temperature.

Some of these materials are unduly expensive and while includable in the broad aspects of the invention, may be excluded from a commercial and practical sense. Others are deliquescent and unless mixed and reacted with other ingredients which mitigates this characteristic, may be excluded from a commercial and practical sense.

A further and prime requirement of the material making up the backup strip is that it have a melting temperature not greater than the solidifying temperature of the metal of the weld bead. The solidifying and melting temperatures for a given material or steel are usually the same. For iron, this solidifying or melting temperature is 1535° C. For steel or most of the alloys thereof, it may be from 50-250° C. less, depending on the amount and type of alloying ingredients.

In other words, the portions of the strip immediately adjacent to the edges must melt. Correlative with this requirement, the material must have a low (e.g. less than .01 calorie per second per centimeter thickness per square centimeter of area and degree C.) thermal conductivity, otherwise heat would be conducted away from the portions immediately adjacent the edges faster than heat is transferred to the portion and no melting would result. The metals, e.g. copper, zinc, aluminum, are thus excluded from the invention.

The selection of this melting temperature depends upon a number of factors such as the shape of the weld bead to be obtained, that is to say, whether the shape is to have a large or small degree of convexity. This shape for a given melting temperature will in turn depend upon the thickness of the members being welded, the speed of movement of the welding electrode in a direction parallel to the edges; and to a much lesser extent the conductivity of the material. Thus for slow linear welding speeds, there is a greater time period possible for heat to be conducted to the backup strip and a greater amount of the backup strip will melt for a given melting temperature than if the speed of welding were more rapid. For high linear welding speeds and given desired shape of weld bead, a low melting temperature material for the backup strip will be chosen than for slower speed welding where a higher melting temperature material will be selected.

It will be appreciated that all of the oxides abovementioned have melting temperatures above the melting temperature of steel. However, as is well known, the mixture of two or more of these oxides or the mixture of one or more oxides with one or more of the halides mentioned, will in all instances produce a mixture having a melting temperature lower than the melting temperature of any one of the individual oxides or fluorides employed. By properly proportioning, in manners well known in the art, the various oxides, fluorides or chlorides and fusing them all together, a material can be obtained having, within limits, any desired melting temperature within the ranges required by the present invention. It is to be noted that small amounts of impurities usually always found in commercially available materials will exert a further lowering of the melting temperatures below the handbook figures. All of the fluorides and the chlorides listed each have melting and boiling temperatures within the ranges required by the present invention.

Of the materials above-mentioned, the fluorides of calcium, barium, and sodium are preferred.

The various oxides above-referred to with minor exceptions, are usually not found or available commercially in the pure oxide state, but are found or available as complex mixtures or compounds of two or more of such oxides. Thus many ores are mixtures or compounds of one or more silicates, aluminates, silico aluminates, titanates, or zirconates. Also certain known compounds when heated in the presence of each other, e.g., calcium carbonate and lithium carbonate, form such mixtures or compounds. So long as such complex mixtures or compounds meet the requirements above set forth, they are included within the invention.

It is to be noted that any impurities in such ores which might evolve a gas in the presence of the heated weld metal, will, because the invention calls for melting or fusing the material of the backup strip prior to its use, have already evolved such gas such that it will not produce porosity in the weld bead.

In summary, in accordance with the invention, a weld backup member is provided comprised of a large homogeneous mass of a material which has been completely fused or melted and allowed to congeal, such material being: (a) nonhydroscopic; (b) nondeliquescent; (c) inert to the molten weld metal; (d) does not contain elements or compounds which will migrate to the molten weld bead and effect undesirable alloys therewith; (e) has a melting temperature less than the melting temperature of the metal to be welded and substantially above, e.g. 200° C., the boiling temperature of water; (f) has a low thermal conductivity; (g) a boiling temperature at least 50° C. above the melting temperature of the metal being welded, and (h) does not react chemically or break down chemically at this temperature to produce a gas.

Some of the materials coming within the above classification are relatively expensive and in order to reduce the amount of such materials required for an individual backup strip, it is possible in accordance with the invention, to mix a filler material in with the material of the invention before it has congealed, such filler material being any of the known ceramics or refractories having a melting temperature higher than that of the metal being welded. Obviously, as the amount of filler material is increased, a point will be reached where it commences to have an adverse effect on the shape of the weld bead. Normally this point will occur where the amount of filler material is in excess of 50% by volume of the material in accordance with the invention.

Fused materials of the type within the present invention are normally relatively fragile and further in accordance with the invention, the backup strip has intimately associated therewith flexible materials, e.g. foraminous or pervious sheets, loosely woven cloth or random strands, either of metal or other fibrous materials, all of which have a melting temperature, charring temperature, or burning temperature as the case may be, above the melting temperature of the base material employed for the backup member and if the metal or fibrous materials will be heated by and in contact with the molten weld metal, then characteristics identical to those for such base material should be selected.

The backup strip may take any form such as to closely fit against the backside of the members adjacent to the edges to be welded and may be held in position in any desired way. For pipe, in accordance with the invention, the backup strip is in the form of a ring having its outer surface in firm engagement with the inner surface of the pipe. Further, the ring is expandable but presents a continuous surface to the weld bead.

The principal object of the present invention is the provision of a new and improved material for a backup strip which overcomes all of the objections heretofore known for backup members and which insures a nonporous and well formed weld bead on the under or backside of the members being welded.

Another object of the invention is the provision of a new and improved weld backup strip which eliminates the problems of moisture in the vicinity of the weld bead.

Another object of the invention is the provision of a new and improved weld backup member which must have been heated to a temperature high enough during its course of manufacture as to drive off all moisture and so that upon congealing, it has little or no porosity through which air can migrate to the molten weld bead during the welding operation.

Another object of the invention is the provision of a new and improved weld backup member made up of a material subject to breakage and the like which includes flexible reinforcing means intimately associated therewith to prevent the member from separating into individual pieces in the event of a breakage.

Another object of the invention is the provision of a new and improved weld backup member having imbedded therein flexible reinforcing means.

Another object of the invention is the provision of a new and improved weld backup member particularly intended for backing up the weld seam in pipe welding so arranged as to provide an effective continuous circumferentially extending backup member so that the member need not be shifted during a welding operation.

The invention may take physical form in certain materials and combinations of materials and in certain shapes and combinations of shapes, the preferred embodiments of which will be described in detail in this specification and illustrated in the accompanying drawing which is a part hereof and wherein:

FIGURE 1 is a side elevational view of a weld backup member embodying the present invention in operative association with members being arc welded, portions of the backup strip being broken away to show the internal construction in its broad aspects;

FIGURE 2 is a fragmentary end cross-sectional view of a pipe to be welded in end-to-end relationship with another pipe and having a weld backup strip with expanding means on the interior thereof illustrating a preferred embodiment of the present invention;

FIGURE 3 is a fragmentary view, somewhat enlarged, showing the arrangement for holding the ends of the ring in axially abutting engagement, the pipe being welded being superimposed in phantom;

FIGURE 4 is a cross-sectional view of FIGURE 3 taken approximately in the line 4—4 thereof; and, FIGURE 5 is a cross-sectional view of FIGURE 3 taken approximately in the line 5—5 thereof.

Referring now to the drawings wherein the showings are for the purposes of illustrating preferred embodiments only of the invention, and not for the purposes of limiting same, FIGURE 1 shows a pair of members 10 having edges 11 in close spaced relationship to be welded with a backup strip 12 constructed in accordance with the present invention positioned on the lower side of the members 10 and an arc welding electrode 13 being advanced longitudinally toward the members 10 and moved sidewardly in the direction of the edges 11 to deposit a molten weld bead 14. The electrode 13 is suitably energized from a source of arc welding power 15 having one terminal connected to the electrode 13 and the other terminal connected to both of the members 10. A pair of electrode drive rolls 16 advance the electrode longitudinally toward the members 10 and other means not shown advance the rolls 16 and the electrode 13 sidewardly in a direction parallel to the edges 11. The above is all generally conventional in the art of arc welding and need not be detailed further herein.

The edges 11 in the preferred embodiment of the invention are slightly spaced one from the other so as to increase in a manner well known in the art, the depth of penetration of the arc for a given arc current and speed of sideward movement of the electrode. Also, in the embodiment shown, the edges are beveled as at 11' for similar reasons well known.

The energization of the electrode 13 in relation to the thickness of the members 10, the spacing of the edges 11 and the speed of sideward movement of the electrode, are all so adjusted that the edges will be fused clear to the lower side of the members 10. In a manner well known in the art, the backup strip 12 prevents the molten metal from dripping out of the space between the edges and assists in shaping the under or backside of the weld bead, that is to say, the side of the weld bead remote from the welding electrode. The shape of the upper or near side of the weld bead is determined by other factors with which the present invention is not concerned. The electrode may have a line of movement only parallel to the edges but preferably it has additionally a lateral oscillation which provides a somewhat wider weld bead and insures even melting of both edges even when well spaced to assist the depth of penetration.

The backup member 12 in addition to assisting in shaping of the underside of the weld bead, also excludes the atmosphere from the molten metal preventing the formation of porosity in this portion of the deposited weld bead. The backup member 12 in accordance with general practice, has a length generally greater than that of the edges 11 to be welded and a width appreciably greater than the spacing between the edges 11 and the upper surface 18 is generally shaped so as to conform and fit tightly against the undersurface of the members 10. Any means may be employed for holding the member 12 in such engagement, but as such means are conventional in the art, they are not shown in the figures.

In accordance with the invention, the member 12 is formed of a material which is first heated to the melting point and then poured or cast to the ultimate desired shape such that the surface 18 will fit snugly against the underside of the members 10 to be welded. The material of the member 12: (a) has a melting temperature below the melting temperature of the members 10; (b) a boiling temperature at least 50° C. above the melting temperature of the members 10; (c) is non-hydroscopic; (d) is non-deliquescent; (e) is inert to the metal of the members 10; and (f) does not contain materials or compounds which will migrate into the molten weld metal and form undesirable alloys therewith. When the members 10 are of steel, the material preferred for the member 12 is sodium fluoride. Sodium fluoride as is known has a melting temperature of 985° C. appreciably less than the melting temperature 1535° C. of steel, and a boiling temperature of 1704° C. somewhat higher than the melting temperature of steel. Sodium fluoride is particularly desirable for the material of the member 12 because if it should boil in the heat of the arc, the gas produced serves to evolve upwardly through the space between the edges 11 and helps to protect the arc from the atmosphere. However, as the boiling temperature is above the melting temperature of steel, any gas bubbles formed collapse before the steel congeals with the result that the gas does not produce porosity in the hardened weld bead.

Further in accordance with the invention, the member 12 is provided with internal reinforcing means which in the preferred embodiment of the invention is a woven screen of soft iron or the like which is imbedded in the sodium fluoride by pouring the molten sodium fluoride around the screen and allowing the sodium fluoride to solidify. In this molten condition, the sodium fluoride flows through the interstices of the screen, resulting in a reinforcing member which is intimately in contact with and able to give structural strength to an otherwise mechanically weak material.

Obviously, the material of the screen 20 may be of any other flexible material which is not adversely affected by the heat of the molten sodium fluoride or other material from which the member 12 is formed. Asbestos fibers, glass fibers, or the like may also be employed for this purpose. Perforated sheets of metal or other materials which are not adversely affected by the heat of the molten material may be used. Also a solid metal member forming the side of the backup strip remote from the edges 11 could be employed.

It is to be noted that using the reinforcing member 20, if the material of the member 12 should crack or break, the edges of the break or crack will remain in close fitting relationship so that the member 12 will still exclude air from the underside of the weld bead.

It is furthermore to be noted that the member 12 is preferably a single solid homogeneous unit. However, the invention does not exclude the member 12 being made up in a plurality of members formed of pieces of material all in close fitting relationship with each other and with the backside of the members 10. However, the invention does exclude granules of the type and size heretofore found in welding fluxes which have an extremely high ratio of surface area to volume. For the purposes of defining the present invention, the ratio of surface area to volume is less than 24, that is to say, the member 12 should be made up of portions where the surface area of each portion in square inches is less than 24 times the volume in cubic inches.

Other materials which have been tried and found very satisfactory for a backup strip when melted and cast to the ultimate desired shape in accordance with the invention are calcium fluoride; a mixture of calcium fluoride and sodium fluoride; and a 60–40% by weight mixture of calcium fluoride and aluminum oxide. Wollastonite, feldspar, cryolite are also satisfactory.

Sillimanite, mullite, conventionally used for backup strips, have too high a melting temperature and are not included in the present invention.

FIGURES 2–5 show the present invention applied to the arc welding of the ends of pipe into continuous lengths of pipe. In these figures, the members to be welded are shown as two cylindrical pipes 10' each having edges 11 to be welded disposed in axially aligned and slightly spaced relationship. The weld backup member 32 is in the shape of a split ring having an outer diameter approximately equal to the inner diameter of the pipe 10' and a radial thickness as is deemed necessary. The axial length is such that the strip extends across the space between the edges and engages the inner surface of both pipes. The ends 33 of the member 32 overlap in an axial direction and as shown, the axial width of both ends tapers toward the ends in a uniform manner. The tapered surfaces of the ends are held in abutting engagement by any suitable means such that there is no gap at the ends as viewed from the space between the edges 11. This may be accomplished in a number of different ways, but in the embodiment of the invention shown, a channel member 34 fits over the outer surface of the member 32 with its sidewalls 35, 36 overlapping the sides of the member 32 adjacent to the ends of the ring. The width of the channel member 34 is greater than the width of the ring 32 and resilient means which in the embodiment of the invention shown, are in the form of a sinusoidal spring 37, are positioned between the sidewall 35 and the side of one end of the ring 32. The other sidewall 36 is shorter in length than the sidewall 35 and terminates at or close to the other end of the ring 32. Clamping means in the form of a toggle screw 38 through the wall 35 bears against one side of the ring 32 forcing it against the other channel wall 36 and prevents relative circumferential movement of the ring 32 relative to the channel 34.

In the embodiment of the invention shown, the base of the channel 34 extends circumferentially around the inner surface of the member 32 as shown at 40, 41 and forms an expansion strip for the member 32. The expansion strip in the ring 32 may then be expanded in any known manner, but in the embodiment of the invention shown, an operating assembly 43 is positioned on the axis of the pipes 10' and includes three push rods 44 equally spaced which extend outwardly to the metal expansion strip 40, 41. A three lobe cam 45 rotatable by a handle, not shown, acts to force the push rod outwardly and expand the member 32 into tight fitting engagement with the inner surface of the pipes 10'.

It will be noted that in this embodiment of the invention, a reinforcing member 20 is also provided similar to or identical with the reinforcing member of the embodiment of FIGURE 1. It will also be appreciated that the backup strip can take the shape of a long rod either cylindrical in cross section or rectangular or polygonal shape which may or may not have a central reinforcing member as desired. The only requirement of the invention being that the material forming the backup member 12 having a melting temperature below the melting temperature of the metal being welded, a boiling temperature above the melting temperature of the metal being welded, be inert to the metal being welded, be nonhydroscopic and nondeliquescent. Furthermore, the material should have a low conductivity which would thus exclude any of the metals themselves as the material of the backup member 12, although the invention does not exclude such metals having the materials otherwise defined as included in the invention on one surface thereof.

The invention has been described with reference to preferred embodiments. It will be appreciated that other embodiments will occur to others upon a reading and understanding of this specification, such embodiments differing radically from those described herein and it is my intention to include all such modifications and alterations insofar as they come within the scope of the appended claims.

Having thus described my invention, I claim:

1. A weld backup strip for steel and its alloys consisting essentially of at least one of the following ingredients selected from the class consisting of the fluorides of lithium, calcium, barium, strontium, lanthanum, rare earths, magnesium, sodium, zirconium, chromium, iron, cobalt, nickel, cadmium, and manganese; and the chlorides of copper, lanthanum, the rare earths, strontium, calcium and barium, said ingredients being completely interfused and in the form of a solid homogeneous mass having a surface area to volume ratio less than 24 and being present in such relative proportions that the melting temperature is less than 1535° C. and means for holding said strip as a unit during use.

2. A weld backup strip consisting essentially of fused sodium fluoride and means for holding said strip as a unit during use.

3. A weld backup strip consisting essentially of fused calcium fluoride and means for holding said strip as a unit during use.

4. A weld backup strip consisting essentially of a fused mixture of sodium fluoride and calcium fluoride and means for holding said strip as a unit during use.

5. A weld backup strip consisting essentially of a fused mixture of calcium fluoride and aluminum oxide which have been completely fused together and cast into a solid homogeneous mass, the fluoride and oxide being present in such proportions that the melting temperature of the mixture is less than 1535° C. and means for holding said strip as a unit during use.

6. The weld backup strip of claim 1 wherein said fused ingredients also include one or more of the ingredients selected from the class consisting essentially of the oxides of calcium, the rare earths, zirconium, aluminum, magnesium, titanium, lithium, nickel, silicon, chromium, vanadium, strontium, manganese, barium and columbium and means for holding said strip as a unit during use.

7. A weld backup strip for steel consisting essentially of at least one ingredient selected from the class consisting of the chlorides of copper, lanthanum, the rare earths, strontium, calcium and barium, said ingredients being fused prior to use and means for holding said strip as a unit during use.

8. A weld backup strip for steel consisting essentially of at least one ingredient selected from the class consisting of the fluorides of lithium, calcium, barium, strontium, lanthanum, rare earths, magnesium, sodium, zirconium, chromium, iron, cobalt, nickel, cadmium and manganese, said ingredients being fused prior to use and means for holding said strip as a unit during use.

9. A weld backup strip for steel consisting essentially of at least one ingredient selected from the class consisting of the fluorides of lithium, calcium, barium, strontium, lanthanum, the rare earths, magnesium, sodium, zirconium, calcium, iron, cobalt, nickel, cadmium, and manganese, together with at least one ingredient selected from the class consisting essentially of the chlorides of copper, lanthanum, the rare earths, strontium, calcium and barium, said ingredients being fused prior to use and means for holding said strip as a unit during use.

References Cited by the Examiner

UNITED STATES PATENTS

| 1,987,341 | 1/35 | Kachel | 113—111 |
| 2,430,266 | 11/47 | Zimmerman | 113—111 |
| 2,434,321 | 1/48 | Kleiner et al. | 29—491 |
| 2,472,523 | 6/49 | Dillon et al. | 113—111 |
| 2,691,952 | 10/54 | Wilson et al. | 113—111 |
| 2,792,626 | 5/57 | Chyle | 29—491 |
| 2,820,427 | 1/58 | Chyle et al. | 113—111 |
| 2,847,958 | 8/58 | Norton et al. | 113—111 |
| 2,916,001 | 12/59 | Chyle et al. | 113—111 |

FOREIGN PATENTS

| 24,283 | 11/08 | Great Britain. |
| 6,138 | 12/09 | Great Britain. |
| 378,802 | 8/32 | Great Britain. |

CHARLES W. LANHAM, *Primary Examiner.*

WHITMORE A. WILTZ, JOHN F. CAMPBELL, *Examiners.*